United States Patent [19]
Traksel et al.

[11] 3,770,228
[45] Nov. 6, 1973

[54] AIR INLET FLAP

[75] Inventors: Johan Traksel, Chatsworth; Joseph D. Dupcak, Studio City, both of Calif.

[73] Assignee: Lockheed Aircraft Corporation, Burbank, Calif.

[22] Filed: Dec. 8, 1971

[21] Appl. No.: 205,882

[52] U.S. Cl. ............................. 244/53 B, 137/15.1
[51] Int. Cl. ........................................... B64d 29/00
[58] Field of Search ............ 244/53 R, 53 B, 42 CA, 244/42 A, 42 D, 42 CD, 42 R; 137/15.1, 15.2

[56] References Cited
UNITED STATES PATENTS

| | | |
|---|---|---|
| 3,652,036 | 3/1972 | Sans et al. .......................... 244/53 B |
| 3,059,878 | 11/1962 | Kerry et al. ......................... 244/53 B |
| 2,539,089 | 1/1951 | Lear .................................. 244/53 R |

*Primary Examiner*—George E. A. Halvosa
*Assistant Examiner*—Edward R. Kazenske
*Attorney*—George C. Sullivan et al.

[57] ABSTRACT

A series of inlet fences or spoilers carried on the nacelle of an aircraft turbine engine which are used to selectively divert streamlines which would otherwise become detached at the inlet lip. This selectively variable air-inlet geometry provides for minimum drag during cruise and yet obviates engine surge or stall or other effects detrimental to the engine which could otherwise occur on the ground and at low forward velocity when crosswinds combine with high engine power demands.

10 Claims, 7 Drawing Figures

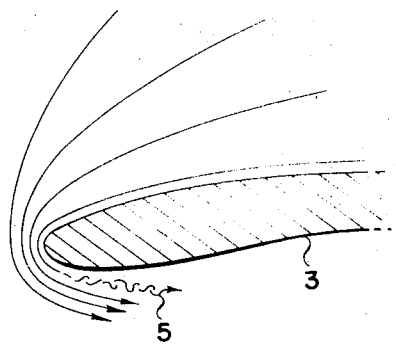
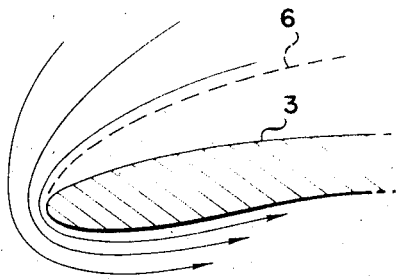
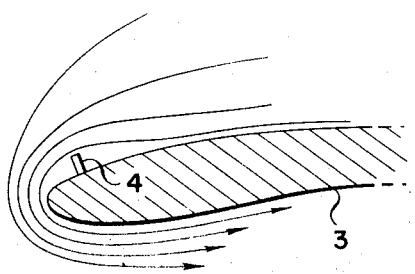
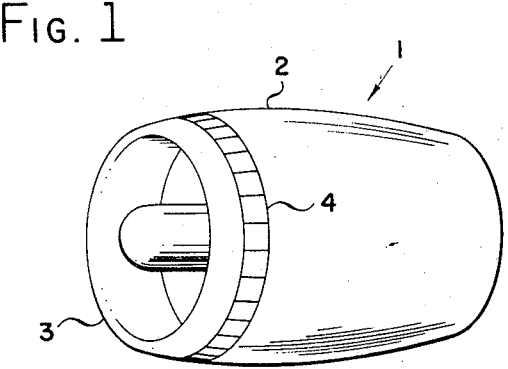
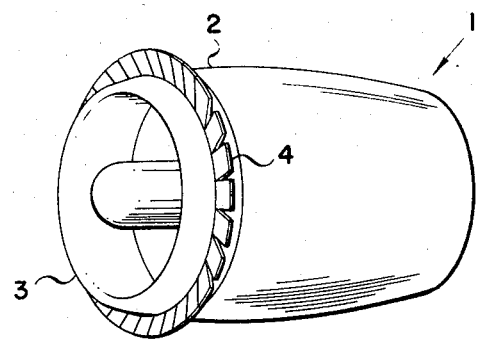

JOHAN TRAKSEL
JOSEPH D. DUPCAK
INVENTORS.

AIR INLET FLAP

BACKGROUND OF THE INVENTION

Prior Art

Heretofore there have been employed various means to control air distribution to the inlet of an aircraft turbine engine under both static and dynamic operating conditions. Most commonly used means for air inlet control are complex "blow-in" doors. A disadvantage of such doors is that they require a sharp bend or diversion in the air flow and therefore result in poor air distribution. The doors also allow for noise to be radiated to the side. Another technique to improve static performance is shown in U.S. Pat. No. 2,948,111 to Nelson, wherein there is described an inflatable means for changing the inlet lip geometry. However, the structural aspects of prior designs and poor performance have precluded their commercial acceptance.

SUMMARY OF THE INVENTION

The present invention is directed to a novel and improved means for selectively fencing the aerodynamic flow about an inlet lip on a turbine engine during certain operating conditions, thus providing successful engine operation at both high and low aircraft speeds. Specifically, a plurality of mechanical spoilers are retractably mounted adjacent to, and circumferentially disposed about at least a portion of the inlet lip. These spoilers may be selectively extended radially with respect to the longitudinal axis of the engine to produce an effective fence whereby the airstream flowing over the engine nacelle is diverted to cause a desirable change in the flow of inlet air at the lip. This arrangement enables high-performance engine air inlets, of the type designed for high-speed level flight, to be satisfactorily operated statically and at low forward speed in high crosswinds without inducing unacceptable flow distortion at the engine inlet face. Also, the design of the present invention lends itself to be economically retrofitted into existing designs in order to improve static and crosswind performance.

The spoiler mechanism of the invention should not be confused with spoilers or lift control devices of the type disclosed in U.S. Pat. Nos. 2,503,585 or 2,948,111 which are concerned with mechanisms for controlling the effective lift of the aircraft.

It is, therefore, an object of the invention to provide novel and improved inlet flaps, spoilers, or the like which allows the inlet design to be optimized for high-speed cruise conditions while still allowing satisfactory engine operation under static conditions, particularly in adverse cross-wind conditions.

Another object of the invention is to provide a novel and improved means for overcoming undesirable flow separation of the airflow pattern at the inlet of a turbine engine which could otherwise result in a deterioration of engine performance.

Another object of the invention is to provide a novel and improved air inlet flap device that is easily manufactured, light in weight, and that can be retrofitted to existing inlets.

Yet another object of the invention is to provide a novel and improved means for securing a function similar to prior art devices intended to perform a similar function but with improved performance and economic attributes and without increase in sideward dispersion of inlet radiated noise.

These and other objects of the invention will become more readily apparent upon consideration of the following specification and the described drawings.

BRIEF DESCRIPTION OF THE DRAWINGS

FIG. 1 is a perspective view of a turbine engine having the features of the instant invention incorporated therein and with the fence device shown in its retracted condition.

FIG. 2 illustrates the apparatus of FIG. 1 with the fence device in its extended position.

FIG. 3 is a schematic diagram of the lip portion of a turbine engine inlet illustrating the aerodynamic flow thereabout under a first operating condition.

FIG. 4 is a view similar to FIG. 3 illustrating air flow under an alternate operating condition.

FIG. 5 is a view similar to FIGS. 3 and 4, illustrating the inlet fence of the invention in an extended configuration.

DESCRIPTION OF THE PREFERRED EMBODIMENT

Figure 6:
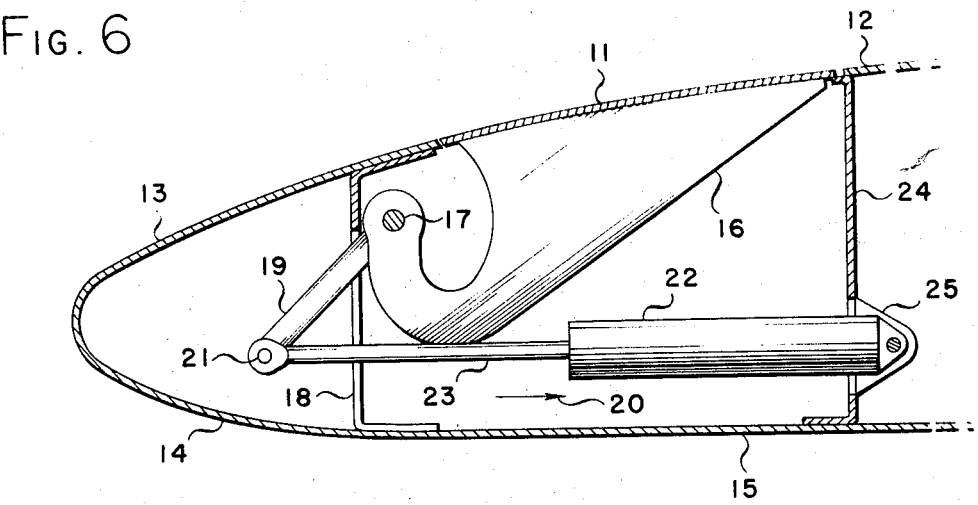
FIG. 6 is a fragmentary view, in cross section, illustrating the operating mechanism for selectively controlling the position of the inlet fence.

There is shown in FIG. 1 a turbine engine having an enclosing nacelle 1 or annular cowling. Circumferentially disposed about the cowling 2 and adjacent the forward lip 3 thereof is a series of aerodynamic flaps or petal-like spoilers, a typical one of which is identified at 4. These flaps 4 are shown in the retracted position in FIG. 1, wherein they interpose no obstacle to the flow of air over the lip 3 and cowling 2. The retracted position shown in FIG. 1 is the preferred operating condition for normal engine operation, and as would be encountered during the cruise phase of an aircraft flight.

The flaps 4 may be selectively actuated so as to move them into an extended position as shown in FIG. 2. In this condition the flaps 4 are essentially perpendicular to the exterior surface of the nacelle 1 at the base of the flaps 4. This effectively alters the aerodynamic characteristics of the lip shape in order to force the air flow to provide the desired inflow condition. A more detailed explanation of the airflow characteristics under the two operating conditions will be given hereinafter in conjunction with the description of FIGS. 3-5. It should be understood that the distance between the leading edge of lip 3 and the mounting locating of the circumferential flaps 4 is at a predetermined location with respect to the longitudinal axis of the engine, and extends outwardly (viz, radially) a predetermined distance into the surrounding air flow. Both the axial location and the degree of extension into the air flow stream depends upon the shape and size of the inlet and lip of the engine cowling, as well as the inlet's operational requirements.

Although FIGS. 1 and 2 illustrate a fence that is disposed substantially all of the way around the periphery of the engine cowling, it should be understood that the extent to which the flaps extend circumferentially may be reduced to conform with the desired aerodynamic characteristics of a particular installation, and to accomodate various kinds of inlet shape or nacelle geometry or location on the airplane. That is, the fence can be restricted in an arcuate dimension from essentially zero to the full 360° circumference of the nacelle, and need not necessarily be continuous.

The flaps 4 shown in FIGS. 1 and 2 can be either solid or perforated to permit controlled leakage of the air flow. Any suitable mechanism can be employed to selectively extend and retract the flaps whether by automatic control or in response to a manually instituted command.

While it is preferred that the flaps comprising the fence extend outwardly from the surface of the nacelle so as to be substantially perpendicularly therefrom, if desired the flaps may be directed outwardly at an angle either towards or away from the inlet end of the engine.

There is diagrammatically shown in FIG. 3 a typical air flow pattern around the inlet lip during static operation in a crosswind. As a result of the lip geometry, the flow has a tendency to separate as indicated at 5 for certain combinations of inlet velocity and crosswind velocity. To overcome this undesirable flow separation it becomes necessary to controllably alter the airflow pattern. Depending upon the operational requirements of the aircraft, which have to be met at the low end of the speed regime, a lip shape of the type shown in FIG. 4 can be constructed which will obviate inlet flow separation. A lip shape or geometry which is suitable to prevent separation at the low end of the speed regime is indicated at 6 in FIG. 4. However, the shape or geometry which is suitable to prevent air flow separation at the low end of the aircraft's speed regime is unsuitable at the high end of the speed regime as exists during aircraft cruise.

The present invention provides a practical means for selectively affecting the required shape 6. As is shown in FIG. 5, the selective extension of flap 4 will force the airflow to follow a pattern which will aerodynamically form the desired lip shape for the inflow condition depicted in FIG. 4, on a lip designed for operation at less than supersonic speeds. Flap 4 is located at a predetermined distance from the leading edge of lip 3 and may be located at a predetermined radial location on the external lip.

Although depicted in the foregoing example for a subsonic air inlet, it should be understood that the invention is also applicable to supersonic and other inlet systems where inlet flow separation could otherwise cause a deterioration in performance.

There is shown in FIG. 6 a suitable mechanism for selectively actuating the extensible flaps for diverting the airflow surrounding the inlet. The retracted position is shown in FIG. 6 and comprises flap 11 which is flush-mounted with respect to exterior surface 12 of the cowling and the forward surface 13 or leading edge of the exterior side of the lip. The interior side of the forward edge of the lip 14 extends smoothly and continuously with the interior wall 15 of the inlet. An arm is secured to flap 11 and is pivotally mounted so as to permit rotation around shaft 17. Shaft 17 is suitably mounted to the cowling structure, and may for example be carried by a bearing member secured to partition 18. Arm 19 is adapted to rotate with arm 16 about shaft 17, and carries a pin 21 at its lower terminus. A hydraulic cylinder 22 is secured to a member 25 which is mounted on a fixed member 24. Actuation of hydraulic cylinder 22 will cause rod 23 to be retracted in the direction of arrow 20, thereby rotating arms 16 and 19.

Figure 7:
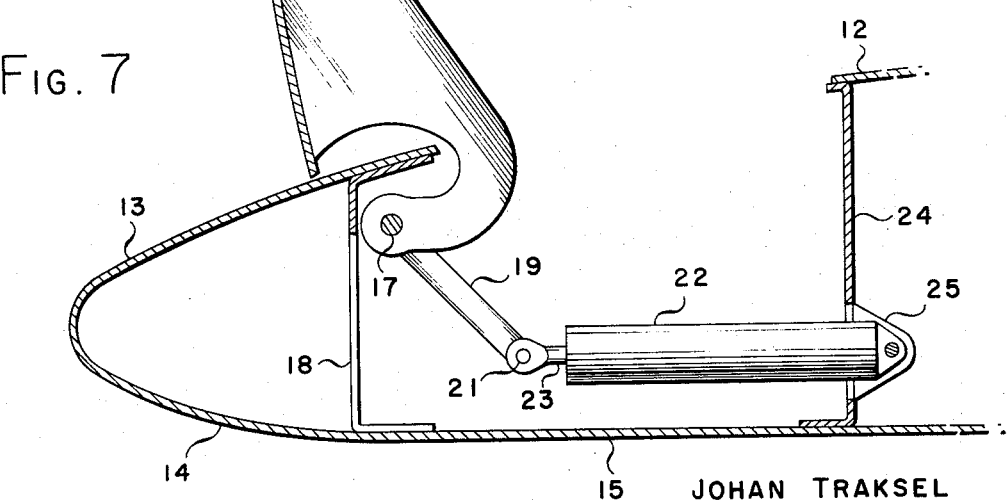
FIG. 7 is a view similar to FIG. 6 illustrating the mechanism in an extended position.

FIG. 7 illustrates the apparatus of FIG. 6 with hydraulic cylinder 22 fully actuated (viz., member 25 fully retracted). As can be seen this will result in flap 11 being extended to a substantially perpendicular position with respect to the surface 13.

In a practical construction, a large improvement in inlet performance, as measured by increased total pressure recovery and decreased distortion, is obtained by utilization of the above-described inlet fence. Practical tests have been made demonstrating satisfactory operation at greatly reduced distrotion levels with an inlet flow rate corresponding to an inlet throat Mach number of approximately 0.55 and a crosswind velocity of 40 knots, utilizing a continuous four inch fence located one inch aft of the inlet leading edge. The axial distance from the inlet leading edge to the fence is fixed while the angle of the fence relative to the inlet centerline is adjustable.

Although a preferred embodiment of the device has been described, it will be understood that within the intended scope of the invention various changes may be made in the form, details, proportion and arrangement of the parts, the combination thereof and mode of operation, which generally stated consists in a device capable of carrying out the objects set forth, as disclosed and defined in the appended claims.

What is claimed is:

1. Turbine engine air inlet control apparatus, comprising:
   means defining a lip surrounding the forward end of a turbine engine and providing an air inlet therefor;
   said air inlet having a continuous imperforate inner wall defining a path of air to the engine through said inlet;
   selectively extendable and retractable fence means mounted aft of said lip in radial disposition with respect to the longitudinal axis of the engine and which, when extended, remains aft of the forward end of the inlet, to form a substantially contiguous extension of the outer surface of said forward end for diverting the airflow surrounding said inlet, said fence means deflecting the airflow exterior to said inlet into said path; and
   actuator means operatively connected to said fence means for extending said fence means under a first operating condition and retracting said fence means under a second operating condition.

2. Apparatus as defined in claim 1 wherein said lip is substantially cylindrical and radially disposed about the axis of said engine, and said fence means is circumferentially mounted aft of said lip.

3. Apparatus as define in claim 1 including an engine nacelle carrying said lip and wherein said fence means is circumferentially mounted on and extended from said nacelle aft of said lip.

4. Apparatus as defined in claim 1 wherein said fence means comprises a plurality of hinged flaps disposed in side-by-side relationship about at least a portion of the circumference of said nacelle.

5. Apparatus as defined in claim 3 wherein said fence means comprises a ring of hinged flaps movable in unison between the extended and retracted conditions.

6. Apparatus as defined in claim 5 wherein said actuator means comprises:
   a linear hydraulic actuator selectively operable between an extended position and a retracted position; and
   linkage means coupling said actuator to said hinged flaps for converting the linear displacement of said hydraulic actuator to angular displacement of said flaps about the hinge pivot.

7. Apparatus as defined in claim 5 wherein each of said flaps comprises a solid rectangular member which extends substantially perpendicularly with respect to the surface of said nacelle when said actuator is in the extended position.

8. Apparatus as defined in claim 1 wherein said defining means includes:
   a hollow conduit having an inlet end and surrounding said engine and carrying said lip; and
   a plurality of hinged flaps movably mounted on said conduit at generally equally spaced points completely about the inlet end of said conduit carrying said lip, said flaps being selectively movable to a generally perpendicular position with respect to the surface of said conduit to form a substantially circular fluid barrier about the inlet end of said conduit.

9. Apparatus as defined in claim 8 wherein said flaps are directed generally radially outward peripherally about said inlet end, so as to form an outwardly extending collar thereabout.

10. Apparatus as defined in claim 9 wherein said outwardly directed flaps, when extended, are angled slightly rearward relative to said inlet end.

* * * * *